Nov. 10, 1953  E. D. VELAZQUEZ  2,658,587
SLIDING DEVICE COMBINED WITH AUTOMATIC
BRAKES FOR AUTOMOTIVE VEHICLES
Filed June 26, 1951  4 Sheets-Sheet 1

INVENTOR:
Edmundo Duran Velazquez

BY
ATTORNEY.

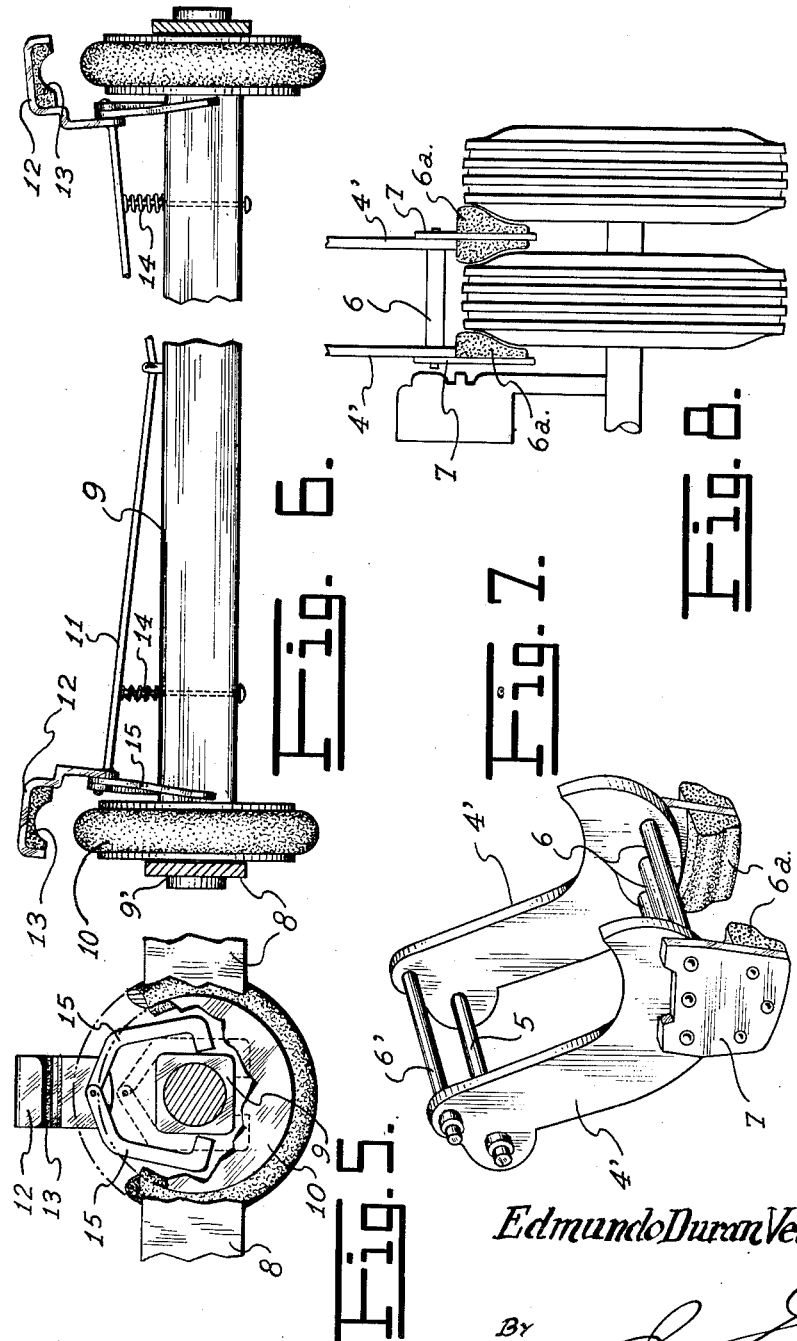

Nov. 10, 1953
E. D. VELAZQUEZ
2,658,587
SLIDING DEVICE COMBINED WITH AUTOMATIC
BRAKES FOR AUTOMOTIVE VEHICLES
Filed June 26, 1951
4 Sheets-Sheet 3
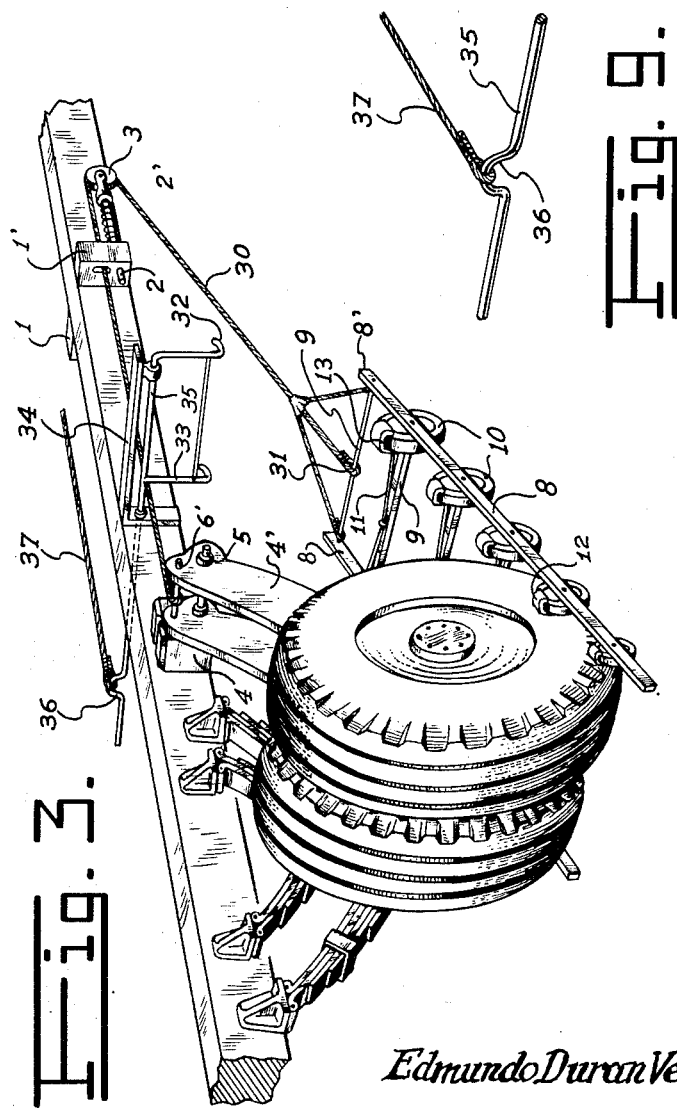
INVENTOR:
Edmundo Duran Velazquez,
BY
ATTORNEY.

Nov. 10, 1953 E. D. VELAZQUEZ 2,658,587
SLIDING DEVICE COMBINED WITH AUTOMATIC
BRAKES FOR AUTOMOTIVE VEHICLES
Filed June 26, 1951 4 Sheets-Sheet 4

INVENTOR:
Edmundo Duran Velazquez,
BY
ATTORNEY.

Patented Nov. 10, 1953

2,658,587

UNITED STATES PATENT OFFICE 2,658,587

SLIDING DEVICE COMBINED WITH AUTO-MATIC BRAKES FOR AUTOMOTIVE VEHICLES

Edmundo Duran Velazquez, Mexico City, Mexico

Application June 26, 1951, Serial No. 233,516
Claims priority, application Mexico July 1, 1950

9 Claims. (Cl. 188—4)

The present invention refers to a device or attachment for automotive vehicles in general and refers more particularly to a sliding device with automatic brakes, for automotive vehicles and cars, as an emergency braking device.

The sliding device, combined with automatic brakes, of my invention, has for its object the avoidance of so many road accidents caused variously by breakage of brakes, faults in mechanical apparatus, motor breakdowns, and the like, which have cost many lives and the loss of vehicles and merchandise being transported. The sliding device, combined with automatic brakes, of my invention, is intended to reduce such losses to a minimum, which device I shall now describe, with reference to the attached drawings, which illustrate its operation.

In said drawings:

Fig. 3 is a conventional perspective view of the device of the invention when it is in action;

Fig. 5 is a transverse sectional detail of the braking system of the wheels of the sliding device;

Fig. 6 is another detail view of the braking system of the wheels of the sliding device;

Fig. 7 is a conventional perspective view of the eccentric parts, the movement of which produces the braking of the vehicle tires;

Fig. 8 is a detail showing how the eccentric parts, illustrated in Figure 7, act; and Fig. 9 is a detail illustrating the part on which the trigger or release mechanism acts, to actuate the whole device.

Figure 1:
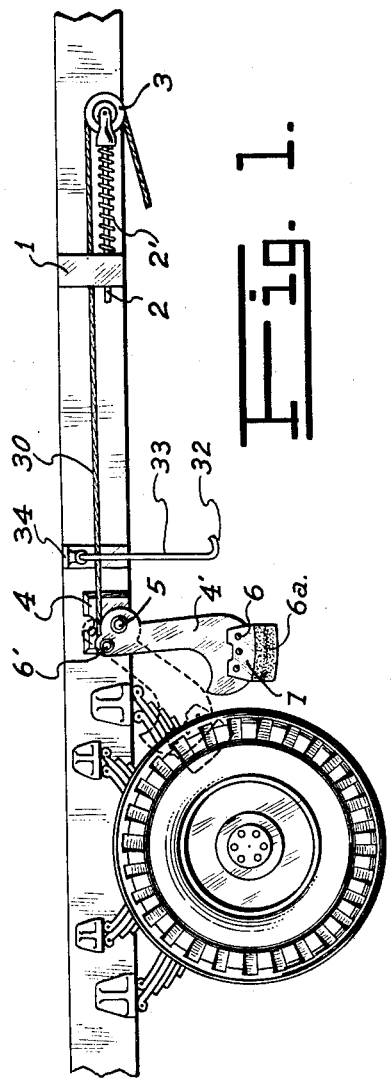
Fig. 1 is a side elevation of the braking device of the invention, but without the sliding device.

Referring to said drawings, the device of the invention provides, first of all, a beam or bridge 1 (Fig. 3) to prevent deformation of the chassis upon actuation of the device. To either side of the chassis and in correspondence with beam 1, are provided towers 1'. Each of these towers has embedded therein a horizontal shaft 2, ending in a small wheel 3. Between small wheel 3 and tower 1 and around shaft 2, is placed a spiral antagonistic spring 2'.

Figure 2:
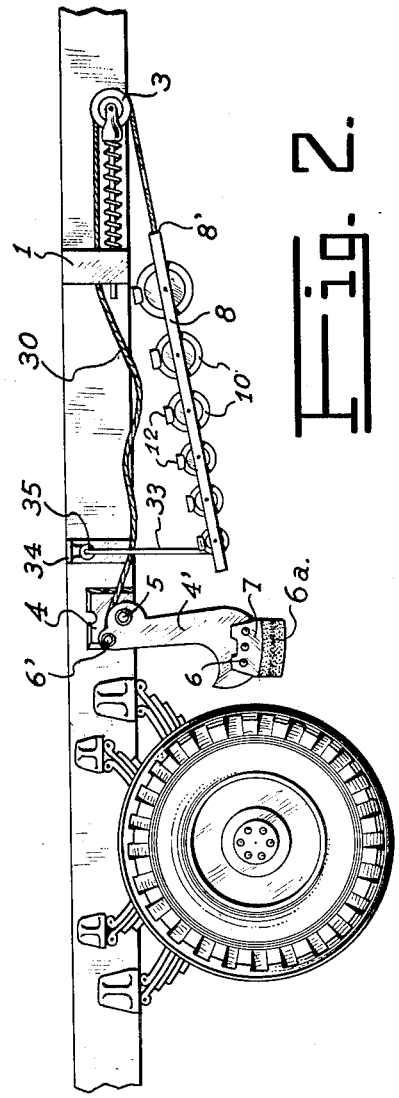
Fig. 2 is also a side elevation of the device of the invention but showing the sliding device in rest position.
Figure 4:
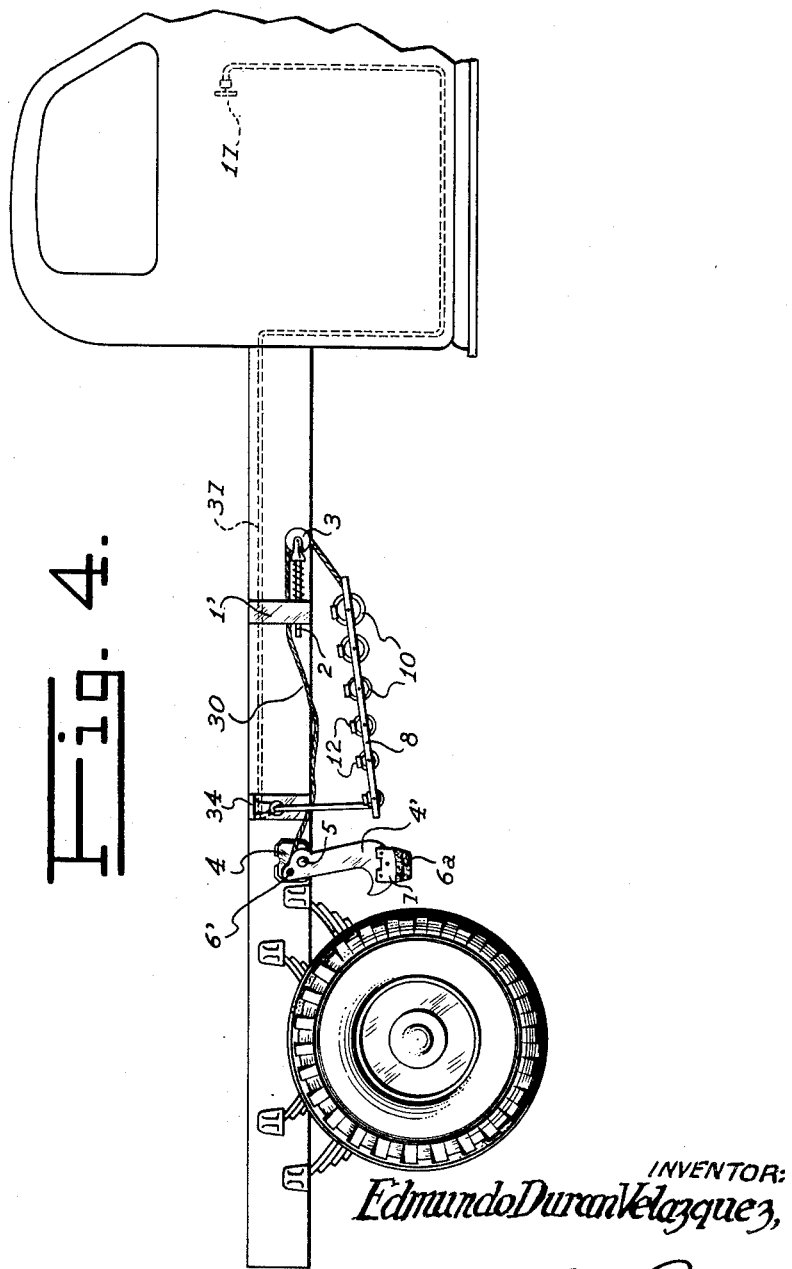
Fig. 4 is a side elevation of the device or attachment of the invention, applied to a truck chassis.

The device of the invention also comprises, secured to either side of the chassis, a metallic block 4 (Figs. 1, 2, 3 and 4), on which are secured, by means of shaft 5, two eccentrics 4'. A plurality of bolts 6, between these two eccentrics 4', joint them with the desired degree of separation and further constitute an abutment for the free movement of said eccentrics, when they act upon the tire, as will be described later. There is also, between the two eccentrics 4', near their upper end, another bolt 6', from which is secured a metallic cable 30 which passes through a perforation in tower 1' and fits on wheel 3, the other end 31 of said cable being secured to the "skate" or platform to which reference will be made later. Each eccentric 4' bears on its lower portion metal plates 7, to which are riveted two or three brake linings 6a, which are wedge-shaped, with the point disposed to the outside.

The device of the invention also comprises a skate or slide formed by longitudinal metal cross-beams 8 and quadrangular section bars 9. All of these bars 9, save that which joins ends 8' of beams 8, are provided at their ends with bushings or ball bearings 9' (Fig. 6), on which are mounted wheels for tires 10, made of rubber or some other material, the size of which decreases progressively with the distance from end 8' of beams 8.

Each of the quadrangular section bars 9 is provided, on its upper portion, with beams 11, the outer ends 12 of which are arcuate in shape and the interior of which is provided with a layer of brake lining 13. These beams 11 are secured, at the center thereof, by means of a rivet, to bars 9, but their ends normally form an arc 12, in raised position, due to the antagonistic spring devices 14 placed on said bars 9, near their ends. In order to provide a means for brake lining 13 to conttinue acting on wheels 10, after being placed in contact therewith by the weight of the vehicle, as will be described later, the ends of beams 11, at the beginning of arc 12, support two arcuate parts 15 (Fig. 5) which, when the beams are in raised position due to the action of spring 14, support the sides of quadrangular bars 9, but when said beams 11 descend, due to the weight of the vehicle, embrace said bars 9, locking with the lower part thereof and thus maintaining tires 10 braked.

This skate or sliding device is normally raised above the ground and secured by claws 32 of swing 33, which is secured to an angular beam 34, that in turn is fastened to the chassis. Shaft 35 of swing 33 traverses the chassis and joins the shaft of the swing corresponding to the braking device on the other side of the chassis. This shaft 35 has shaped on its center portion an ear 36 (Fig.

9) to which is secured the end of metal cable 37, actuated from the truck cab by means of a release or trigger device 17, of any known type.

As a variation of the present invention, the wheels and tires 19, in the sliding device, may be substituted with rollers of solid rubber or some other material, and beams 11 may be replaced by a steel plate provided with a brake lining and supported at one of its ends by a shaft transverse to the sliding device and held in raised position, at its other end, upon the rollers, by spring action. In this way the weight of the vehicle, upon overcoming the resistance of the springs, will cause the steel plate, covered with brake lining, to act upon the rollers.

Operation

When the driver of the vehicle considers it necessary to use the emergency brake, he operates release or trigger mechanism 17, thus tensioning cable 37 which in turn inclines ear 36 (Fig. 9), thus causing, through shaft 35, the oscillation of swing 33, the claws 32 of which release the sliding device. This device falls by gravity precisely in front of the rear wheels of the vehicle which, because of their momentum, ride up on said sliding device, pulling it backward and thus creating tension in cable 30. The end of this cable secured to bolt 6' of eccentrics 4', causes the latter to move on their shaft, which in turn causes brake linings 6a to shift between the two tires and act on them as a braking element. Simultaneously the action of the weight of the vehicle upon the sliding device will cause the arcuate end 12 of beams 11 to press upon the tires and rubber wheels 10 and brake linings 13 continue to act thereon due to the action of arcuate parts 15, upon embracing quadrangular bars 9.

Having thus described the invention, what I consider as new and desire to secure by Letters Patent is:

1. A brake for a vehicle having a chassis carried by dual wheels, comprising a crank pivotally mounted on the chassis adjacent the dual wheels thereof, said crank having parallel arms spaced the width of a tire with one arm disposed to fit between the dual wheels and the other adjacent the free side of one of the dual wheels, a pair of brake shoes on opposite sides of said one arm to engage the adjacent sides to the dual wheels and a single brake shoe on the other arm for engaging the free side of the adjacent wheel, said brake shoes being triangular in cross-section and conforming to the contour of the tires of the dual wheels, and means for swinging said crank to engage said brake shoes with the corresponding tires of the dual wheels.

2. A brake as defined in claim 1 wherein said means comprises a sliding device for fitting under the dual wheels as a skid, means for releasably suspending said device from the chassis in front of the dual wheels, means for releasing said device from said suspending means to drop said device directly in front of the dual wheels so that the wheels will roll up onto said device, a pulley mounted on the chassis, and a cable connected between said device and said crank and trained around said pulley, whereby the pull exerted by the dual wheels on said device will actuate said crank to apply the brakes to the wheels.

3. A brake for a vehicle having a chassis mounted on front and rear wheels, comprising brake means cooperative with at least one of the rear wheels of the vehicle and including a crank for actuating said brake means, a sliding device for fitting under the wheel as a skid, means for releasably suspending said device from the chassis in front of the wheel, means for releasing said device from said suspending means to drop said device in front of the wheel so that the wheel will roll up onto said device, a pulley mounted on the chassis, and a cable connected between said device and said crank and trained around said pulley, whereby the pull exerted by the wheel on said device will actuate said crank to apply said brake means.

4. A brake as defined in claim 3 wherein said pulley is journalled on a support that is slidably mounted on the chassis and spring-biased to urge the pulley away from the wheel.

5. A brake as defined in claim 3 wherein said sliding device comprises a frame having a plurality of cross-beams, small wheels journalled on the ends of said cross-beams, bowed spring strips fixed centrally to and overlying said cross-beams, and brake shoes on the ends of said strips for engaging said small wheels upon being depressed by the vehicle wheel rolling up onto said device.

6. A brake for a vehicle having a chassis carried by dual wheels comprising a sliding device, means releasably suspending said sliding device from the vehicle chassis in front of the dual wheels, means for releasing said device from said suspending means to drop said device in front of the wheels so that the wheels will roll up onto said device, said device comprising a frame having a plurality of cross-beams, small wheels journalled on the ends of said cross-beams, bowed spring strips fixed centrally to and overlying said cross-beams, and brake shoes on the ends of said spring strips for engaging said small wheels upon being depressed by the vehicle wheel rolling up onto said device.

7. A brake as defined in claim 6 wherein springs are disposed between the end portions of said cross-beams and said spring strips to bias said brake shoes from said small wheels.

8. A brake as defined in claim 6 wherein latch hooks pivotally depend from the end portions of said spring strips to hook under said cross-beams when said strips are depressed and thereby lock said brake shoes against said small wheels.

9. A brake as defined in claim 6 wherein said small wheels are of progressively increased diameter from the rear to the front end of said device.

EDMUNDO DURAN VELAZQUEZ.

References Cited in the file of this patent

UNITED STATES PATENTS

| Number | Name | Date |
|---|---|---|
| 1,171,268 | Smith | Feb. 8, 1916 |
| 2,442,322 | Daley | May 25, 1948 |

FOREIGN PATENTS

| Number | Country | Date |
|---|---|---|
| 96,114 | Switzerland | Apr. 28, 1921 |
| 190,502 | Great Britain | Dec. 28, 1922 |
| 411,137 | Great Britain | June 1, 1934 |
| 452,521 | Great Britain | Aug. 25, 1936 |